(12) United States Patent
Osako et al.

(10) Patent No.: US 9,310,822 B2
(45) Date of Patent: Apr. 12, 2016

(54) SOLAR PHOTOVOLTAIC SYSTEM INCLUDING A POWER CONDITIONER

(75) Inventors: Kazuyoshi Osako, Tokyo (JP); Yoshiaki Sato, Narashino (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 836 days.

(21) Appl. No.: 13/579,056

(22) PCT Filed: Dec. 20, 2010

(86) PCT No.: PCT/JP2010/072882
§ 371 (c)(1),
(2), (4) Date: Oct. 26, 2012

(87) PCT Pub. No.: WO2011/102051
PCT Pub. Date: Aug. 25, 2011

(65) Prior Publication Data
US 2013/0046416 A1 Feb. 21, 2013

(30) Foreign Application Priority Data
Feb. 16, 2010 (JP) .................. 2010-031126

(51) Int. Cl.
G05F 5/00 (2006.01)
G05F 1/67 (2006.01)
H02J 3/38 (2006.01)

(52) U.S. Cl.
CPC . *G05F 1/67* (2013.01); *H02J 3/385* (2013.01); *Y02E 10/58* (2013.01)

(58) Field of Classification Search
USPC ............................. 700/298; 136/245; 307/86
See application file for complete search history.

(56) References Cited

U.S. PATENT DOCUMENTS

2007/0137688 A1* 6/2007 Yoshida ..................... 136/244
2010/0236612 A1* 9/2010 Khajehoddin et al. ....... 136/252

FOREIGN PATENT DOCUMENTS

| JP | 2004-280220 A | 10/2004 |
| JP | 2005-73321 A | 3/2005 |
| JP | 2007-58845 A | 3/2007 |
| JP | 2008-251612 A | 10/2008 |

OTHER PUBLICATIONS

International Search Report with English translation dated Mar. 29, 2011 (four (4) pages).

* cited by examiner

*Primary Examiner* — Mohammad Ali
*Assistant Examiner* — Sheela S Rao
(74) *Attorney, Agent, or Firm* — Crowell & Moring LLP

(57) ABSTRACT

Disclosed is a solar photovoltaic power generator system that includes a solar cell panel and a power conditioner that controls a voltage or a current of generated power output from the solar cell panel as an operating value in accordance with a characteristic of the solar cell panel to search a maximum output point of the generated power so as to be supplied to a power system. The power conditioner includes a data memory module that stores a plurality of operating values and a plurality of patterns of the generated powers from the solar cell panel based on the operating values, and a maximum power point tracking module that adds a new operating value based on the pattern of the generated power in the past to calculate the operating values for the next search, and sets the maximum value through an algorithm.

15 Claims, 7 Drawing Sheets

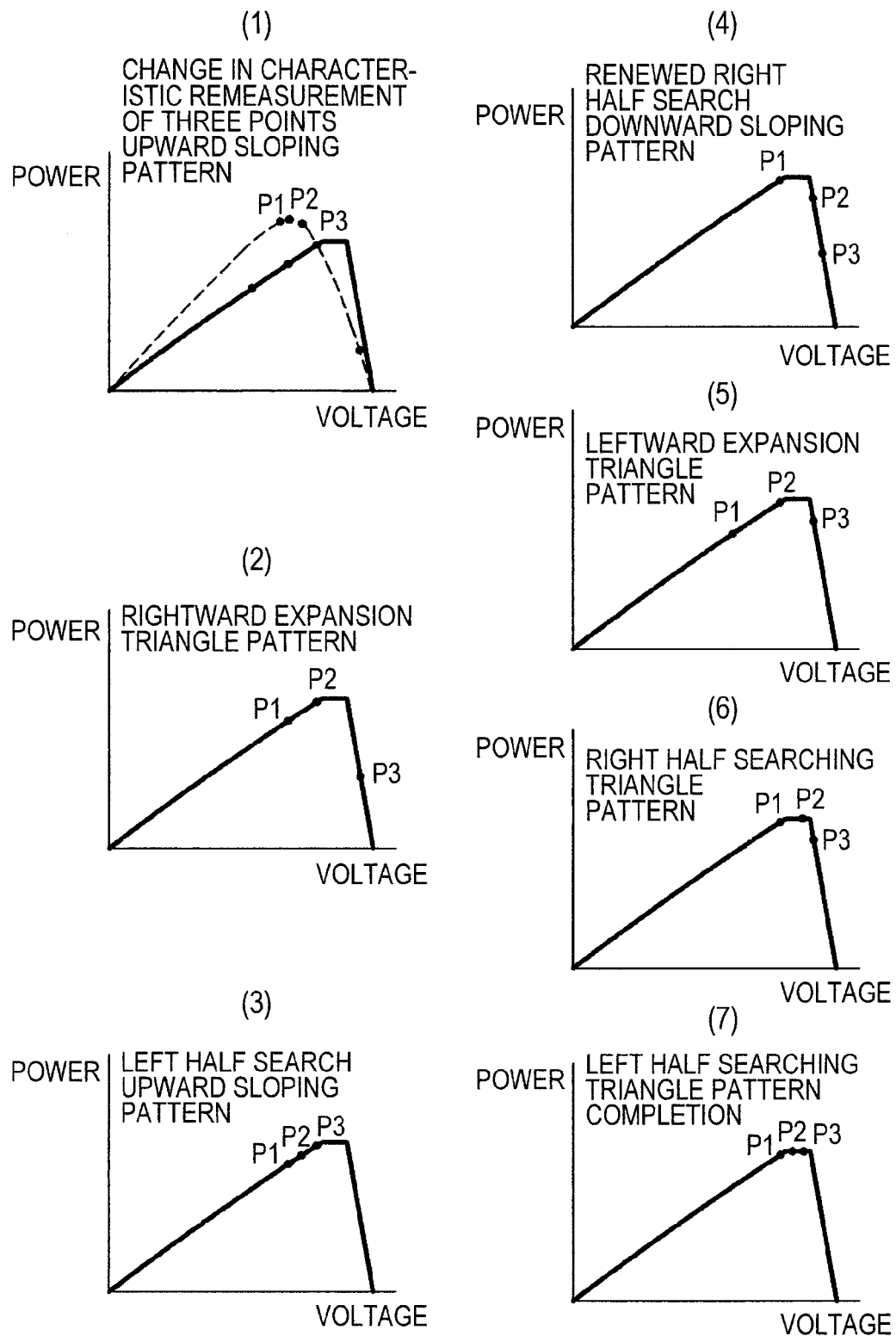

FIG. 8

| NUMBER OF SEARCHES | P1 | P2 | P3 | TYP | TYPM1 |
|---|---|---|---|---|---|
| i−1 | VP1 (i−1), WP1 (i−1) | VP2 (i−1), WP2 (i−1) | VP3 (i−1), WP3 (i−1) | TYP (i−1) | TYP (i−2) |
| i | VP1 (i), WP1 (i) | VP2 (i), WP2 (i) | VP3 (i), WP3 (i) | TYP (i) | TYP (i−1) |
| i+1 | VP1 (i+1), WP1 (i+1) | VP2 (i+1), WP2 (i+1) | VP3 (i+1), WP3 (i+1) | TYP (i+1) | TYP (i) |
| i+2 | VP1 (i+2), WP1 (i+2) | VP2 (i+2), WP2 (i+2) | VP3 (i+2), WP3 (i+2) | TYP (i+2) | TYP (i+1) |

FIG. 9

| PREVIOUS | PRESENT | P1 | P2 | P3 | | NEXT OPERATION |
|---|---|---|---|---|---|---|
| Type1 | Type1 | W1< | W2< | W3 | | INCREASE SEARCH |
| | Type2 | W1> | W2> | W3 | | DECREASE SEARCH |
| | Type3 | W1< | W2 | W2>W3 | W1<W3 | RIGHT HALF CENTER SEARCH |
| | | | | W2>W3 | W1>W3 | LEFT HALF CENTER SEARCH |
| Type2 | Type3 | W1< | W2 | W2>W3 | W1<W3 | RIGHT HALF CENTER SEARCH |
| | | | | W2>W3 | W1>W3 | LEFT HALF CENTER SEARCH |
| | Type2 | W1> | W2> | W3 | | DECREASE SEARCH |
| Type3 | Type1 | W1< | W2< | W3 | | REVERSE CENTER SEARCH |
| | Type2 | W1> | W2> | W3 | | REVERSE CENTER SEARCH |
| | Type3 | W1< | W2 | W2>W3 | W1<W3 | RIGHT HALF CENTER SEARCH |
| | | | | W2>W3 | W1>W3 | LEFT HALF CENTER SEARCH |

FIG. 10

| | SEARCH | UPDATE POINT | NEWLY SET VOLTAGE (NEWLY SET ADDITIONAL OPERATING VALUE) |
|---|---|---|---|
| (A) | LEFT HALF CENTER SEARCH (CONVERGENCE) | P1 ← P1 (i−1)<br>P2    NEW<br>P3 ← P2 (i−1) | $VP2 = (VP1\,(i-1) + VP2\,(i-1))/2$ |
| (B) | RIGHT HALF CENTER SEARCH (CONVERGENCE) | P1 ← P2 (i−2)<br>P2    NEW<br>P3 ← P3 (i−2) | $VP2 = (VP2\,(i-2) + VP3\,(i-2))/2$ |
| (C) | RIGHT HALF REVERSE CENTER SEARCH (CONVERGENCE) | P1 ← P2 (i−1)<br>P2    NEW<br>P3 ← P3 (i−1) | $VP2 = (VP2\,(i-1) + VP3\,(i-1))/2$ |
| (D) | LEFT HALF REVERSE CENTER SEARCH (CONVERGENCE) | P1 ← P1 (i−1)<br>P2    NEW<br>P3 ← P3 (i−1) | $VP2 = (VP1\,(i-1) + VP2\,(i-1))/2$ |
| (E) | DECREASE SEARCH (EXPANSION) | P1    NEW<br>P2 ← P1 (i−1)<br>P3 ← P2 (i−1) | $VP1 = VP1\,(i-1) - 2*(VP2\,(i-1) - VP1\,(i-1))$ |
| (F) | INCREASE SEARCH (EXPANSION) | P1 ← P2 (i−1)<br>P2 ← P3 (i−1)<br>P3    NEW | $VP3 = VP3\,(i-1) + 2*(VP3\,(i-1) - VP2\,(i-1))$ |

SOLAR PHOTOVOLTAIC SYSTEM INCLUDING A POWER CONDITIONER

TECHNICAL FIELD

The present invention relates to a solar photovoltaic power generator system, and more particularly, to a solar photovoltaic power generator system aiming at searching a maximum power point of power generation characteristic that changes especially in accordance with solar irradiation and temperature.

BACKGROUND

Adoption of solar photovoltaic systems has been increasing in recent years as awareness of the importance of environmental protection grows, for example, international efforts to reduce $CO_2$ emission aiming at preventing global warming. The solar photovoltaic system is configured to allow the solar cell panel to convert the solar energy into DC current. A power conditioner converts the DC current into AC power (commercial power) so as to be used at the respective facilities.

In most of the cases, the solar cell panel has characteristics that a single maximum power point exists with respect to the voltage or current when the solar irradiation and temperature are kept constant, and it is simply increased at the left side of the maximum power point, and simply decreased at the right side of the maximum power point. The aforementioned characteristic of the solar cell panel changes depending on the solar irradiation and temperature. Accordingly, the voltage or current at the maximum power point fluctuates. The power conditioner that relays between the power system and the panel requires the function for searching the maximum output point by controlling the voltage or the current of generated power output from the solar cell panel. This is referred to as a maximum power point tracking (MPPT) function for the solar photovoltaic power generation.

Patent Document 1 or 2 discloses an example of the power conditioner for a generally employed solar photovoltaic power generator system. The maximum power point tracking method as disclosed in Patent Document 1, so called "hill climbing" method fluctuates the voltage or current by a constant amount, and the voltage or current is operated by a constant amount (constant pitch) in the same direction as the positive direction of the power fluctuation, or in the direction opposite the negative direction of the power fluctuation so as to approach the maximum point.

The maximum power point tracking method disclosed in Patent Document 2 makes the optimum operating voltage for obtaining the maximum power constant irrespective of irradiance of light. The optimum operation voltage is derived from the temperature in proportional thereto in reference to a conversion table.

RELATED ART

Patent Document

[Patent Document 1] JP-A No. 2008-251612
[Patent Document 2] JP-A No. 2007-58845

SUMMARY OF THE INVENTION

Problem to be Solved by the Invention

In the case where the search starting point is separated from the maximum point, and the operation amount (pitch) for fluctuation is small, the method disclosed in Patent Document 1 requires execution of a large number of search operations until the maximum point is located, and as a result, the time taken to reach the maximum point is prolonged. When increasing the operation amount for the purpose of reducing the operation time, the operation is performed while passing over the maximum point. This may cause the risk of the phenomenon that the maximum point cannot be located while increasing and decreasing the operation amount with respect to the maximum point repeatedly. When the maximum point is displaced resulting from change in the characteristic owing to frequent fluctuation of solar irradiation (motion of cloud) and noise, power generation of the panel may be reduced during the effort to reach the maximum point. As the operation amount is constant, it is unavoidable that deviation is generated between the position around the maximum point and the true maximum point. The maximum value contains the resultant deviation corresponding to the operation amount, which may reduce the generated power.

The method disclosed in Patent Document 2 makes the optimum operating voltage constant, and uses the conversion table for obtaining the optimum operation voltage in relation to the temperature. Actually, the maximum point is not searched based on the characteristic of the solar cell panel. The method may fail to locate the maximum point when it is moved in a complicated manner resulting from the characteristic change owing to frequently caused fluctuation of solar irradiation (motion of cloud), fluctuation of temperature and noise.

It is an object of the present invention to provide a solar photovoltaic power generator system that ensures high-speed maximum power point tracking and highly accurate maximum point search.

In order to solve the aforementioned problem, the present invention provides a solar photovoltaic power generator system which includes a solar cell panel, and a power conditioner which controls a voltage or a current of generated power output from the solar cell panel as an operating value in accordance with a characteristic of the solar cell panel to search a maximum output point of the generated power so as to be supplied to a power system. The power conditioner includes an inverter that converts the generated power output from the solar cell panel into a commercial power, an AVR control module that outputs a PWM instruction to the inverter so that the operating value of the generated power output from the solar cell panel is subjected to a variance control, a data memory module that stores a plurality of operating values under the variance control and a plurality of patterns of the generated powers from the solar cell panel based on the operating values, and a maximum point tracking module that adds a new operating value to a part of the operating values in a past search based on the pattern of the generated power in the past search, and calculates the operating values for a next search so as to be supplied to the AVR control module. When the maximum power point tracking module executes the search repeatedly to update the operating value, and a deviation of a plurality of generated powers repeatedly output becomes equal to or smaller than a predetermined value, the maximum output value is set.

In the solar photovoltaic generator system, the maximum power point tracking module adds a new operating value to a part of the operating values in the past search in a direction of the highest power among those in the past search to calculate a plurality of operating values for the next search.

In the solar photovoltaic generator system, the maximum power point tracking module calculates the operating values at 3 points for the search, and adds a new operating value at 1 point to two of the operating values in the past search in the direction of the highest power among those in the past search to calculate the operating values at 3 points for the next search.

In the solar photovoltaic generator system, the maximum power point tracking module calculates the operating values at 3 points for the search, and adds new operating values at 2 points to the operating value at 1 point in the past search in the direction of the highest power among those in the search to calculate the operating values at 3 points for the next search.

In the solar photovoltaic generator system, the maximum power point tracking module adds a new operating value to a part of the operating values in the past search in an expected direction of the maximum point of a characteristic of the solar cell panel to calculate a plurality of operating values for the next search.

In the solar photovoltaic generator system, the maximum power point tracking module calculates the operating values at 3 points for the search, and adds a new operating value at 1 point to the operating values at 2 points in the past search in the expected direction of the maximum point of the characteristic of the solar cell panel to calculate the operating values at 3 points for the next search.

In the solar photovoltaic generator system, the maximum power point tracking module calculates the operating values at 3 points for the search, and adds new operating values at 2 points to the operating value at 1 point in the past search in the expected direction of the maximum point of the characteristic of the solar cell panel to calculate the operating values at 3 points for the next search.

In the solar photovoltaic generator system, the maximum power point tracking module further includes a convergence determination module that determines a state where the deviation of a plurality of generated powers is equal to or smaller than a specified value as convergence, and a renewed search commencement determination module that starts operating in accordance with information from the convergence determination module, and generates a maximum point search instruction again upon change in a plurality of generated powers.

The present invention provides a solar photovoltaic power generator system which includes a solar cell panel, and a power conditioner which controls a voltage or a current of generated power output from the solar cell panel as an operating value in accordance with an operation characteristic of the solar cell panel to search a maximum output point of the generated power so as to be supplied to a power system. The power conditioner includes an inverter that converts the generated power output from the solar cell panel into a commercial power, an AVR control module that outputs a PWM instruction to the inverter so that the operating values at least 3 points of the generated power output from the solar cell panel are subjected to a variance control, a data memory module that stores the operating values at 3 points under the variance control, and sloping patterns at 3 points of the generated powers from the solar cell panel based on the operating values, and a maximum power point tracking module that adds a new operating value to a part of the operating values in a past search based on the sloping pattern of the generated power in the past search, and calculates the operating values for a next search so as to be supplied to the AVR control module. The maximum power point tracking module sets the operating value for the next search to a right side of the operation characteristic of the solar cell panel when the generated power in the past search has an upward sloping pattern, sets the operating value for the next search to a left side of the operation characteristic of the solar cell panel when the generated power in the past search has a downward sloping pattern, and adds an operating value to be at an inner side of the operating values at 3 points when the generated power in the past search has a triangle pattern, which are calculated as the operating values for the next search.

In the solar photovoltaic generator system, the maximum power point tracking module increases a part of the operating values at 3 points to be set for the next search when the generated power in the past search has the upward sloping pattern, decreases a part of the operating values at 3 points to be set for the next search when the generated power in the past search has the downward sloping pattern, and adds the operating value so as to be at the inner side of the operating values at 3 points to be set for the next search when the generated power in the past search has a triangle pattern.

The present invention provides a solar photovoltaic power generator system which includes a solar cell panel, and a power conditioner which controls a voltage or a current of generated power output from the solar cell panel as an operating value in accordance with an operation characteristic of the solar cell panel to search a maximum output point of the generated power so as to be supplied to a power system. The power conditioner includes an inverter that converts the generated power output from the solar cell panel into a commercial power, an AVR control module that outputs a PWM instruction to the inverter so that the operating values of the generated power at least at 3 points output from the solar cell panel are subjected to a variance control, a data memory module that stores a plurality of operating values under the variance control and a plurality of sloping patterns of the generated powers from the solar cell panel based on the operating values, and a maximum power point tracking module that calculates the operating values for the next search based on the sloping pattern of the generated power in the past search so as to be supplied to the AVR control module. When the generated power in the past search has a sloping pattern in one direction, the maximum power point tracking module adds a new operating value to a part of those in the past search to calculate the operating values for the next search so as to be set at a side opposite the operating values in the past search, expected to have a maximum point of the operation characteristic of the solar cell panel.

In the solar photovoltaic generator system, the maximum power point tracking module adds a new operating value to a part of the operating values in the past search in an expected direction of the maximum point of the characteristic of the solar cell panel to calculate a plurality of operating values for the next search.

In the solar photovoltaic generator system, the maximum power point tracking module calculates the operating values at 3 points for the search, and adds a new operating value at 1 point to the operating values at 2 points in the past search in the expected direction of the maximum point of the characteristic of the solar cell panel to calculate the operating values at 3 points for the next search.

In the solar photovoltaic generator system, the maximum power point tracking module calculates the operating values at 3 points for the search, and adds new operating values at 2 points to the operating value at 1 point in the past search in an expected direction of the maximum point of the characteristic of the solar cell panel to calculate the operating values at 3 points for the next search.

The present invention is configured to store operating values and output powers at 3 points obtained in the past search, and to determine operating values for the next search (size and positive/negative direction) based on those data. The 3 points of the operating values are set to $P1(n)$, $P2(n)$ and $P3(n)$ (n: the number of searches). The 3-point operating values (voltage) are set to VP1(n), VP2(n) and VP3(n), and the measured powers are set to WP1(n), WP2(n), and WP3(n), respectively. The 3-point operating values are correlated to establish the relationship of VP1(n)≤Vp2(n)≤VP3(n).

The difference among the initial operating values at 3 points of P1(0), P2(0) and P3(0) is largely fluctuated so that the maximum power point is set between the smaller operating value VP1(0) and the larger operating value VP3(0). In other words, the power WP2(0) at the point P2(0) of the intermediate operating value becomes the highest among those corresponding to the 3 operating values. Each power is measured in reference to the minimum operating value VP1(0), the maximum operating value VP3(0), and the intermediate operating value VP2(0) therebetween within the operative range.

Two points, that is, the point P2(0) corresponding to the intermediate operating value VP2(0) and the point P3(0) corresponding to the operating value VP3(0) as the maximum voltage are newly set to P1(1) and P3(1), respectively so that a new point P2(1) is set therebetween. The operating value at the new point P2(1) is obtained by the following equation: Operating value VP2(1)=1/2*(VP2(0)+VP3(0)). Comparison is made with respect to magnitude among the generated powers WP1(1), WP2(1) and WP3(1) corresponding to the new operating values.

According to the comparative result showing that the generated power pattern has type 3 (TYP3) that contains the maximum point in the relationships of WP(1)<WP2(1) and WP3(1)<WP2(1), the point corresponding to the maximum generated power is considered to be positioned between the points P1(1) and P3(1). The operating value at the new point as the intermediate point between those points is calculated and added for narrowing down.

According to the comparative result showing that the generated power pattern is classified as type 2 (TYP2) of downward sloping pattern as represented by the relationship of WP1(1)>WP2(1)>WP3(1), the point corresponding to the maximum generated power may be positioned between the points P1(0) and P2(0). The points corresponding to the operating values VP1(0) and VP2(0) are newly set to the points P1(1) and P3(1), respectively to calculate and set a new point P2(1) as the intermediate value therebetween for measurement of the generated power WP2(1).

The system according to the present invention is configured to assume the maximum point position based on the generated power pattern, based on which the operating values are calculated to detect the generated power for the next search. Unlike the generally employed "hill climbing" method that fluctuates the operating value by a predetermined amount, the operating values are set by jumping to an area around the assumed maximum point while skipping execution of the intermediate process steps.

When the comparative result shows that the generated power pattern is classified as the upward sloping pattern type 1 (TYP1) as represented by the relationship of WP1(1)<WP2(1)<WP3(1), the relationship of WP1(1)=WP2(0)>WP3(0)=WP3(1) is established, which is inconsistent with the result of the previous measurement. In this case, it is assumed that the characteristic change has occurred to change the maximum point. The respective powers WP1(0), WP2(0) and WP3(0) at the points P1(0), P2(0) and P3(0) are measured again. FIGS. 9 and 10 represent summarized procedures of the process as described above.

In the state where change in the generated power is unique, the past points are set again, and a renewed search is executed based on the newly set data so as to cope with the characteristic change of the solar cell panel. Considering the response time to the subtle fluctuation under the influence of the system, and the new operating value of the panel and the like, waiting period and a plurality of reading times are averaged to stabilize the evaluation amount.

Effect of the Invention

The present invention provides the solar photovoltaic power generator system which ensures the maximum power point tracking at a high speed and accurate maximum point search.

BRIEF DESCRIPTION OF THE DRAWINGS

FIG. 7 is an explanatory view of the maximum power point tracking process in response to change in the characteristic of the solar cell panel.

FIG. 8 is an explanatory view showing data structure of a data memory module.

FIG. 9 is an explanatory view of a maximum point searching rule.

FIG. 10 is an explanatory view of a procedure of calculating the operating values.

EMBODIMENT FOR CARRYING OUT THE INVENTION

Figure 1:
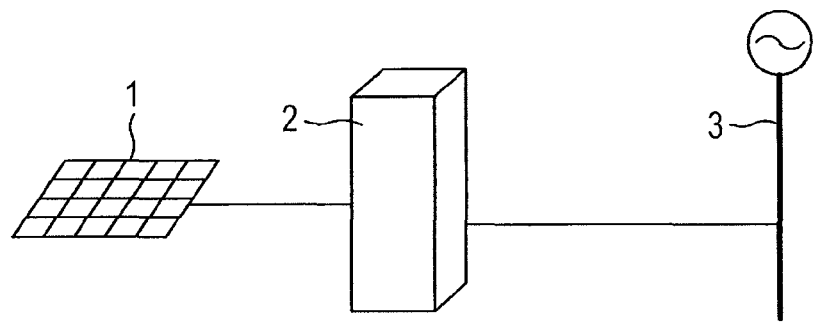
FIG. 1 schematically illustrates a solar photovoltaic power generator system.
Figure 3:
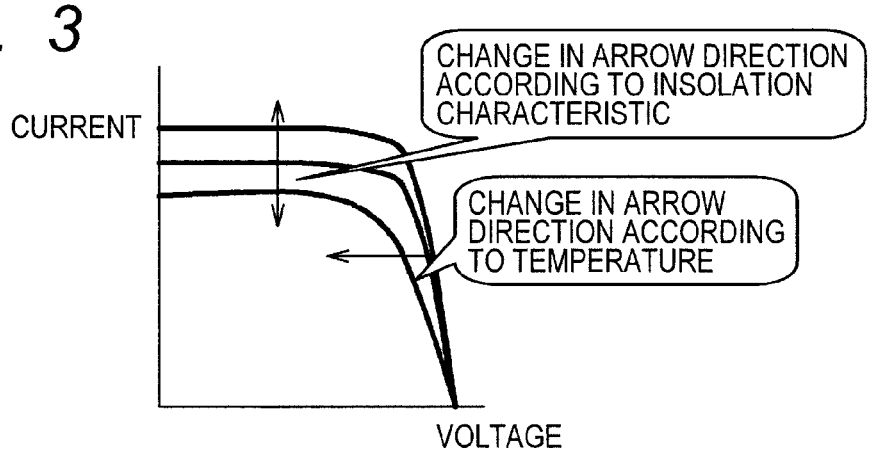
FIG. 3 is an explanatory view on characteristics of voltage and current of power generated by a solar cell panel.
Figure 4:
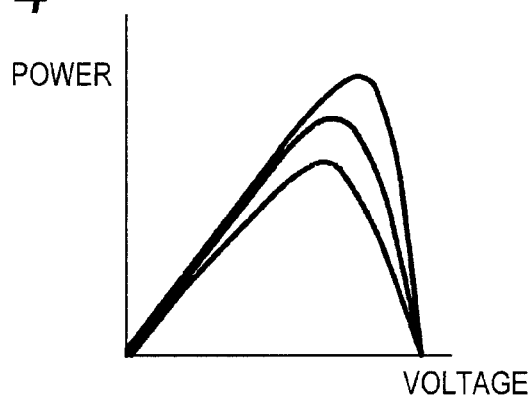
FIG. 4 is a view representing a characteristic of the power generated by the solar cell panel.

An embodiment of the present invention will be described referring to the drawings. FIG. 1 illustrates a general structure of a solar photovoltaic power generator system that uses a power conditioner according to the embodiment. A reference numeral 1 denotes a solar cell panel that exhibits power generation characteristics shown in FIGS. 3 and 4. FIG. 3 shows the relationship between the power generation voltage and current. Referring to the drawing, the current changes as shown by a longitudinal arrow mark upon change in the solar irradiation, and the voltage changes as shown by a lateral arrow mark upon change in the ambient temperature, thus deforming the curve. If there is no change in the temperature and the illuminance, the power has a single maximum power point with respect to the voltage. A reference numeral 2 denotes the power conditioner according to the embodiment, which converts DC power generated by the panel 1 into AC power in synchronization with an AC power system line 3 to be described later. A reference numeral 3 denotes the general power system line, for example, the line at the AC voltage set to 200V or 400V, and the frequency set to 50 Hz or 60 Hz, to which a load of a general user is connected.

The power conditioner 2 operates a PWM instruction to an inverter (described later) upon conversion of the DC power of the solar cell panel 1 into the AC power in synchronization with the system voltage for controlling the voltage or current of the generated power output from the solar cell panel 1 as the operating value. Specifically, the panel voltages (operating values) at 3 points are supplied to the inverter, and the next panel voltages (operating values) are determined according to the change pattern of the 3-point generated power corresponding to the respective operating values in reference to the rule to be described below so as to search the maximum power point.

Figure 5:
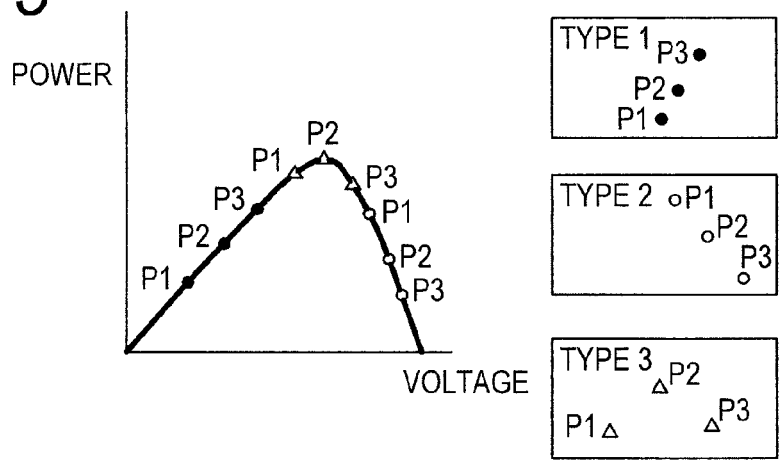
FIG. 5 is an explanatory view with respect to power generation pattern of the solar cell panel and the maximum power point tracking.

FIG. 5 represents 3-point generated power change patterns with respect to power generation characteristic. The upward sloping pattern of black circles P1 to P3 is classified as type 1 (showing that the maximum point is positioned at the right side with higher power). The downward sloping pattern of white circles P1 to P3 is classified as type 2 (showing that the maximum point is positioned at the left side with lower power). The triangle pattern of white triangles P1 to P3 (the maximum point is positioned between P1 and P3) is classified as type 3. Among those patterns, it is found that the triangle pattern 3 contains the maximum point, and accordingly, deviation of the 3-point generated power values is reduced. When this deviation is within the specified value, it is determined that the maximum point has been located. The resultant power is stored, and continuously output so that the maximum power is supplied to the inverter.

The generated power is periodically measured so that the comparison is made between the measured value and the stored maximum power value. The characteristic change is monitored based on the change (longitudinal) in the power value. When the difference between the stored value and the measured value exceeds the specified value, it is determined that the characteristic has been changed. The operating values at the points P1 and P3 of those 3 points at both sides are newly set (the intermediate point P2 is kept unchanged). The thus set 3 points are used to start the maximum point search again, and the power is output at the newly set maximum point. In this way, the maximum output point is repeatedly searched in response to movement of the maximum point (characteristic change) in conjunction with change in the illuminance of the sunlight and the temperature in a day.

Figure 2:
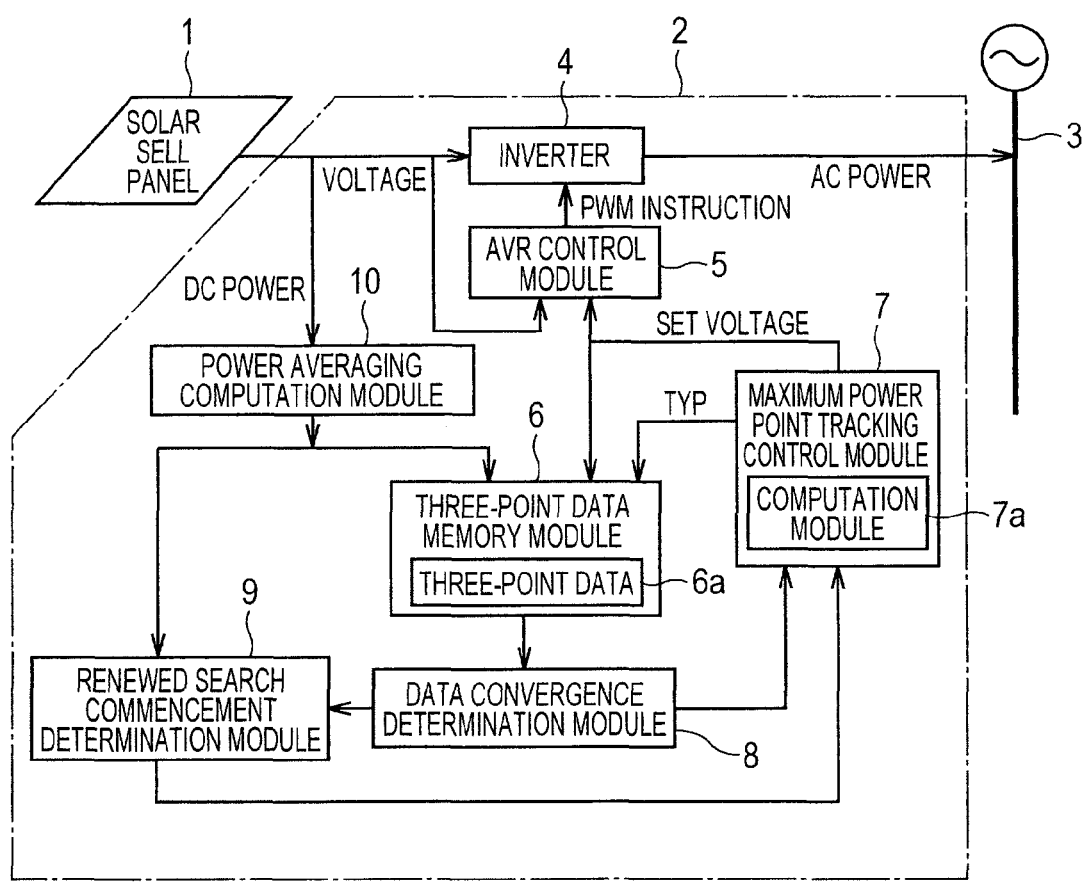
FIG. 2 is a block diagram of a power conditioner according to an embodiment of the present invention.

FIG. 2 is a block diagram of an inner part of the power conditioner 2. A reference numeral 4 denotes an inverter that converts the DC power generated by the solar cell panel 1 into the AC power (commercial power) in synchronization with the system voltage, 5 denotes an AVR (Automatic Voltage Regulator) control module that supplies the PWM signal to the inverter 4 so that the 3-point operating values of the voltage or current of generated power output from the panel 1 are subjected to variance control. The generated power from the solar cell panel 1 is supplied to the inverter 4, and taken into the power conditioner 2 in the form of power and voltage as the information for output control of the solar cell panel 1. The power conditioner 2 determines the operating value (set voltage) for the next search based on the taken power information in accordance with the logic to be described later, and transmits the instruction to the AVR control module 5.

A reference numeral 6 denotes a data memory module that stores 3-point operation values derived from the variance control, and the 3-point generated power patterns from the solar cell panel 1 based on the operating values. Specifically, the read generated power data are paired with the operating values, and further combined with the type (TYP) codes each indicating the 3-point power change pattern. The resultant data are stored in the data memory module 6 as 3-point data 6a. The present and the previous data are stored for each execution of the search as shown by FIG. 8. In other words, in the i-th search, the operating value VP, generated power WP and the type (TYP) in the present search i, and the type (TYPM1) in the previous search i−1 are stored as data.

A reference numeral 7 denotes a maximum power point tracking module that adds an operating value at a new point to a part (2 points) of those at the 3 points in the present or previous search based on the generated power pattern in the previous (past) and the present (past) search operations, allows a computation module 7a to calculate the operating values at 3 points (set voltage) for the next search, and supplies the calculated value to the AVR control module 5. The maximum power point tracking module 7 stores the maximum point search rule as shown in FIG. 9, and the procedure for calculating the operating values as shown in FIG. 10 in the form of algorithm. Based on the rule and the procedure, the computation module 7a calculates the new operating values for the next search. The AVR control module 5 compares the operating values (set voltage) at the 3 points with the generated power voltage from the solar cell panel 1, and outputs the PWM instruction to the inverter 4 so as to approach the operating value (set voltage) for setting of the power voltage of the solar cell panel 1 to the operating value (set voltage).

The generated power from the panel 1 fluctuates by insensible degrees at faster cycle through switching of the inverter. The determination based on the instantaneous value may become faulty. For this, the averaging process is performed by an power averaging computation module 10. A reference numeral 8 denotes a data convergence determination module that determines the state where the deviation of the 3-point generated power data is equal to or smaller than the specified value as convergence, and stops operation of the maximum power point tracking module 7 to finish the maximum power point tracking. The data convergence determination module 8 periodically observes the power at the maximum point continuously to monitor change in power.

A reference numeral 9 denotes a renewed search commencement determination module that receives observation information with respect to the change in power from the data convergence determination module 8, and generates a renewed search instruction upon change in power. The renewed search instruction is transmitted to the maximum power point tracking module 7, and the search for the maximum power point is started. The maximum power point tracking module 7 determines the operating values at 3 points for the next searching direction and distance (operating value, voltage), and outputs the 3-point operating values to the AVR control module and the 3-point data memory module 6 in accordance with the determination.

Figure 11:
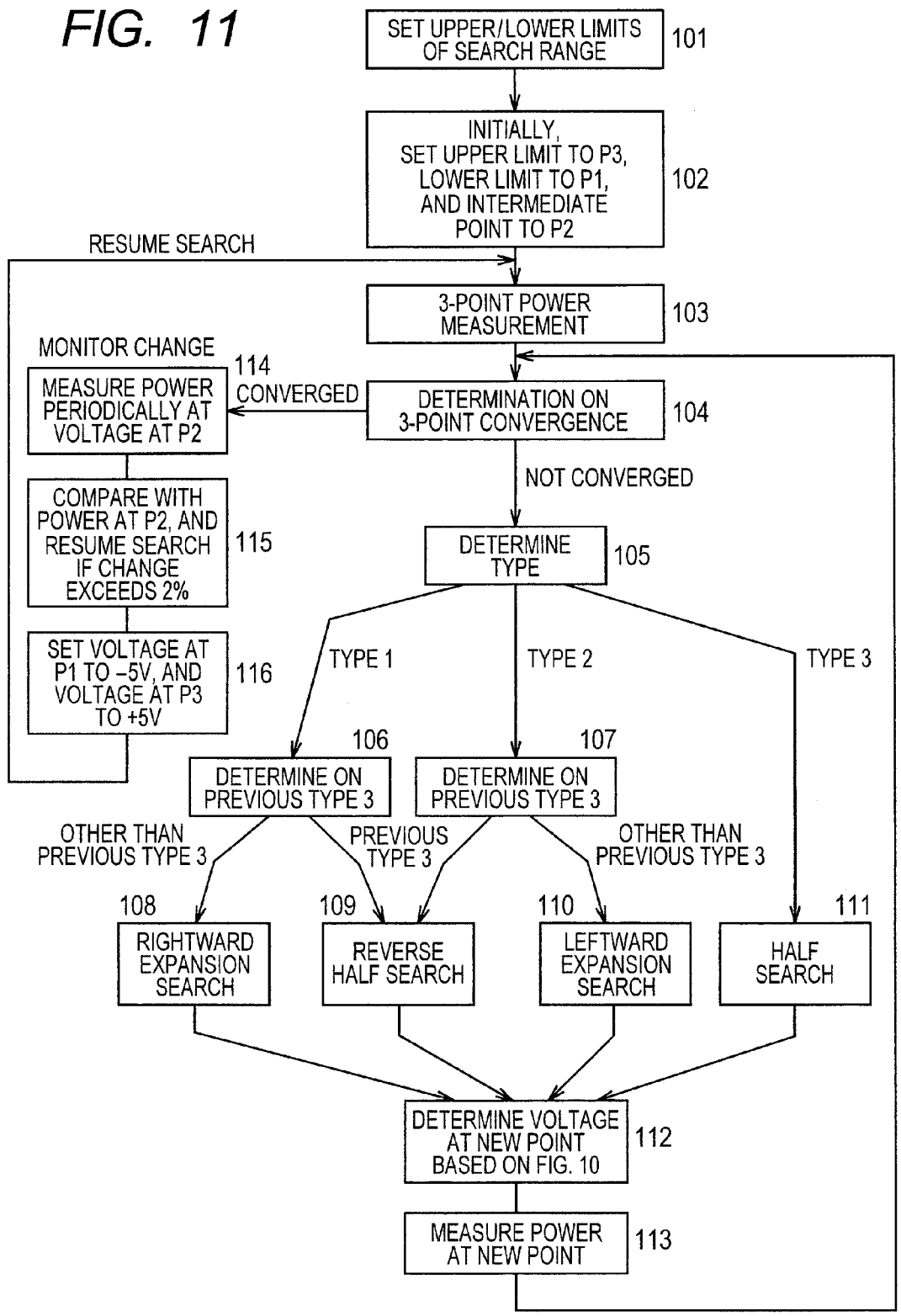
FIG. 11 is a flowchart of the process according to the embodiment of the present invention.

The searching operation will be described based on representative power generation characteristic of the solar cell panel 1 referring to the maximum power point tracking process shown in FIGS. 6 and 7, and the operation flow shown in FIG. 11. As an example for setting of initial voltage values at 3 points, the point P3 corresponding to the operating value VP3 as the upper limit of the set search voltage range, the point P1 corresponding to the operating value VP1 as the lower limit, and the point P2 corresponding to the intermediate operating value VP2 therebetween are set as initial values (FIG. 11, step 102). The voltage data of the respective operating values VP1, VP2, and VP3 are sequentially output from the maximum power point tracking module 7 to the AVR control module 5, and powers corresponding to the respective operating values are measured (FIG. 11, step 103). Referring to part (1) of FIG. 6, WP1 (W1), WP2 (W2), and WP3 (W3) are obtained as the corresponding powers. It is determined that the deviation of the generated power is not converged at the value equal to or larger than the predetermined value (FIG. 11, step 104).

The respective values of measured power are correlated to establish the relationships of W1<W2, W2>W3, and W1>W3. The power in this case has Type (Typ) 3 (FIG. 11, step 105) in reference to FIG. 9. The operating value for "left half center search" (FIG. 11, step 111) is calculated. The state shown in part (2) of FIG. 6 is obtained (FIG. 11, step 112).

Referring to part (A) of FIG. 10, in the "left half center search", the points P1 and P3 in the previous search are used, and the operating value (voltage) corresponding to the point P2 is newly calculated, and interposed between the points P1 and P3. Specifically, the process may be expressed by the equation:

Operating value VP2=(VP1(i−1)+VP2(i−1)/2. That is, the operating value VP2 is calculated so as to set the point P2 at the intermediate position between the previous points P1 and P3.

The aforementioned power measurement result (FIG. 11, step 113) shows the case corresponding to the pattern of TYP3 in the previous search and to the pattern of TYP1 in the present search (FIG. 11, step 105). The operating value for "reverse center search" is calculated (FIG. 11, steps 106, 109) referring to FIG. 9 to determine 3 points in the right half part (FIG. 11, step 112). The state shown in part (3) of FIG. 6 is obtained. In the process for "reverse center search", the operating value (voltage) corresponding to the point P2 is newly calculated, and the points P1 and P3 for the search before the last one as shown in part (B) of FIG. 10 are used. The newly calculated operating value corresponding to the point P2 is added to be at the intermediate position between those points P1 and P3 in the search before the last one. Specifically, the process is expressed as the following equation:

Operating value VP2=(VP2(i−2)+VP3(i−2))/2. The operating value VP2 is calculated and added so that the new point P2 is placed at the center position between the points P1 and P3 in the search before the last one.

The measured power has the pattern of TYP2, and the operating value for "decrease search (leftward expansion)" referring to FIG. 9 is calculated (FIG. 11, steps 106, 109 and 112) (part (E) of FIG. 10). The state shown in part (4) of FIG. 6 is obtained. The power at this time has the pattern of TYP3, and the respective point values of measured power are correlated to establish the relationships of W2>W3, and W1<W3. Then the operating value for "right half center search (right half search)" referring to FIG. 9 is calculated (part (c) of FIG. 10). The state shown in part (5) of FIG. 6 is obtained. This state represents the pattern of TYP3 again. The operating value for "(left half center search) left half search" referring to FIG. 9 is calculated (part (D) of FIG. 10) to obtain 3 points in the left half part. The state shown in part (6) of FIG. 6 is obtained.

This state has the pattern of TYP3 again. The operating value for "right half center search (right half search)" referring to FIG. 9 is calculated (par (C) of FIG. 10) to obtain 3 points in the right half part. The state shown in part (7) of FIG. 6 is obtained. This state has the pattern of TYP3 again. However, difference in power at 3 points is equal to or smaller than the specified value (FIG. 11, step 104). It is determined that the maximum point is located. Further searching operation is stopped to bring the process into the state for monitoring change in power (FIG. 11, step 114). In this state, among operating values (VP1 to VP3) at 3 points in the last search, the generated power corresponding to the intermediate operating value (VP2) is supplied to the power conditioner 2 as the maximum power of the solar cell panel 1.

Figure 6:
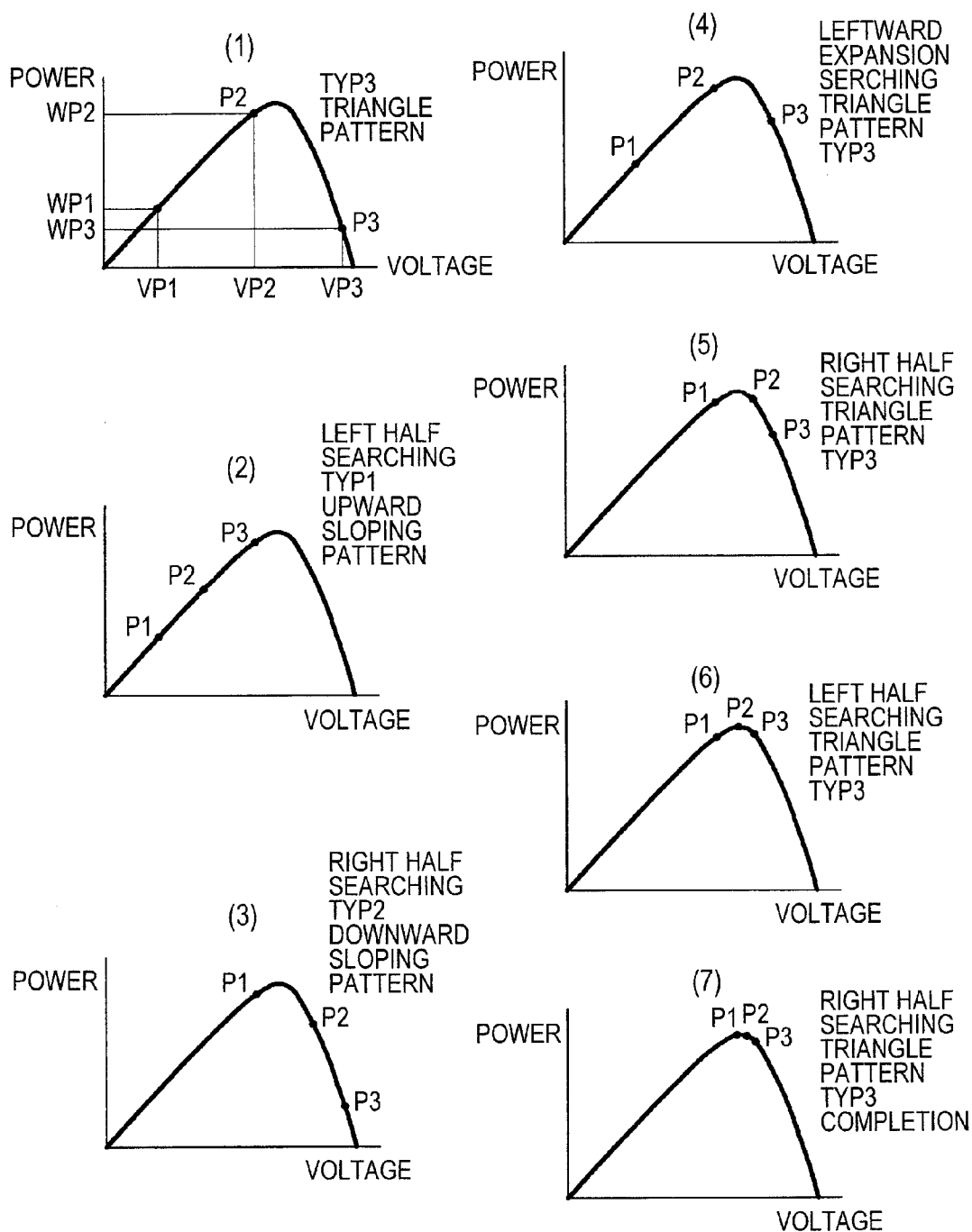
FIG. 6 is an explanatory view of the maximum power point tracking process according to the embodiment of the present invention.

As FIGS. 6(2) to (7) show, the left reverse half search and the right reverse half search are repeatedly executed alternately while taking a large range width with respect to characteristics of the power generated by the solar cell panel 1 for narrowing down the range of the maximum point in a short period. After detection of the generated power having the pattern of Typ3, which allows identification of the maximum point range, the left reverse half search and the right reverse half search are repeatedly executed alternately while taking a small range width with respect to the characteristic of the generated power to identify the area around the maximum point in a short time. Unlike the generally employed search method so called "hill climbing" that fluctuates the operating value by a constant amount, the method according to the present invention may skip the intermediate search process steps. This makes it possible to largely reduce the period for searching the maximum point. The left reverse half search and the right reverse half search are repeatedly executed alternately with respect to the characteristic of the generated power to identify the area around the maximum point, thus improving accuracy for locating the maximum point.

Thereafter, when solar irradiation or the like changes the characteristic from the state shown by the broken line to the state shown by the solid line in part (1) of FIG. 7, change in the power is detected (FIG. 11, step 114), and expanding each position of the points P1 and P3 (the voltage at P1 is expanded by −5V, and voltage at P3 is expanded by +5V) so as to re-measure all the powers at 3 points (FIG. 11, step 103).

It is determined to have the pattern of TYP1 (TYP1 in present search as shown in FIG. 9) (FIG. 11, step 105). The increase search is executed by largely expanding from the present point P3. The operating value of the voltage increased by 2*(Vp3−Vp2) set as the new operating value at the point P3 is calculated (part (F) of FIG. 10), and added. The resultant state shown in part (3) of FIG. 7 is obtained. The power has the pattern of TYP 3. The left half center search is performed (part (A) of FIG. 10). The state shown in part (3) of FIG. 7 is obtained. For the pattern of TYP3 in the previous search and the pattern of TYP1 in the present search, the reverse center search is executed (part (B) of FIG. 10) referring to FIG. 9. The state shown in part (4) of FIG. 7 with the points in the right half part is obtained. Then the left reverse half search and the right reverse half search are repeatedly executed alternately as shown in parts (5) and (6) of FIG. 7 with respect to the typ3. When the state shown in part (7) of FIG. 7 is obtained, the deviation of the respective generated powers is within the specified value. Then the search is stopped, and brought into the state where the power change is monitored (FIG. 11, step 114). In this state, among the operating values at 3 points (VP1 to VP3) in the last search, the generated power corresponding to the intermediate operating value (VP2) is set as the maximum power, and is supplied to the power conditioner 2.

DESCRIPTION OF CODES

1 . . . solar cell panel, 2 . . . power conditioner, 3 . . . power system, 4 . . . inverter, 5 . . . AVR control module, 6 . . . data memory module, 7 . . . maximum power point tracking module, 8 . . . convergence determination module, 9 . . . renewed search commencement determination module, 10 . . . power averaging computation module

The invention claimed is:
1. A solar photovoltaic power generator system which includes a solar cell panel, and a power conditioner which controls a voltage or a current of generated power output from the solar cell panel as a first operating value in accordance with a characteristic of the solar cell panel to search a maximum output point of the generated power so as to be supplied to a power system, wherein:

the power conditioner includes an inverter that converts the generated power output from the solar cell panel into a commercial power, an Automatic Voltage Regulator (AVR) control module that outputs a Pulse Width Modulation (PWM) instruction to the inverter so that the first operating value of the generated power output from the solar cell panel is subjected to a variance control, a data memory module that stores a plurality of the first operating values under the variance control and a plurality of patterns of generated powers from the solar cell panel based on the first operating values, and a maximum power point tracking module that adds a new operating value to a part of the first operating values in a past search of the maximum output point based on a pattern of the generated power in the past search, and calculates second operating values for a next search of the maximum output point so as to be supplied to the AVR control module; and when the maximum power point tracking module executes the search of the maximum output point repeatedly to update the first operating value, and a deviation of a plurality of generated powers repeatedly output becomes equal to or smaller than a predetermined value, the maximum output value is set.

2. The solar photovoltaic power generator system according to claim 1, wherein the maximum power point tracking module adds the new operating value to a part of the first operating values in the past search in a direction of the highest power among those in the past search to calculate a plurality of the second operating values for the next search.

3. The solar photovoltaic power generator system according to claim 1, wherein the maximum power point tracking module calculates the second operating values at 3 points for the search, and adds a new operating value at 1 point to two of the first operating values in the past search in the direction of the highest power among those in the past search to calculate the second operating values at 3 points for the next search.

4. The solar photovoltaic power generator system according to claim 1, wherein the maximum power point tracking module calculates the second operating values at 3 points for the search, and adds new operating values at 2 points to the first operating value at 1 point in the past search in the direction of the highest power among those in the search to calculate the second operating values at 3 points for the next search.

5. The solar photovoltaic power generator system according to claim 1, wherein the maximum power point tracking module adds a new operating value to a part of the first operating values in the past search in an expected direction of the maximum point of a characteristic of the solar cell to calculate a plurality of the second operating values for the next search.

6. The solar photovoltaic power generator system according to claim 1, wherein the maximum power point tracking module calculates the second operating values at 3 points for the search, and adds a new operating value at 1 point to the first operating values at 2 points in the past search in the expected direction of the maximum point of the characteristic of the solar cell to calculate the second operating values at 3 points for the next search.

7. The solar photovoltaic power generator system according to claim 1, wherein the maximum power point tracking module calculates the second operating values at 3 points for the search, and adds new operating values at 2 points to the first operating value at 1 point in the past search in the expected direction of the maximum point of the characteristic of the solar cell to calculate the second operating values at 3 points for the next search.

8. The solar photovoltaic power generator system according to claim 1, wherein the maximum power point tracking module further includes a convergence determination module that determines a state where the deviation of a plurality of generated powers is equal to or smaller than a specified value as convergence, and a renewed search commencement determination module that starts operating in accordance with information from the convergence determination module, and generates a maximum point search instruction again upon change in a plurality of generated powers.

9. A solar photovoltaic power generator system which includes a solar cell panel, and a power conditioner which controls a voltage or a current of generated power output from the solar cell panel as a first operating value in accordance with an operation characteristic of the solar cell panel to search a maximum output point of the generated power so as to be supplied to a power system, wherein:

the power conditioner includes an inverter that converts the generated power output from the solar cell panel into a commercial power, an Automatic Voltage Regulator (AVR) control module that outputs a Pulse Width Modulation (PWM) instruction to the inverter so that the first operating value at least at 3 points of the generated power output from the solar cell panel is subjected to a variance control, a data memory module that stores the first operating values at 3 points under the variance control, and sloping patterns at 3 points of the generated powers from the solar cell panel based on the first operating values, and a maximum power point tracking module that adds a new operating value to a part of the first operating values in a past search of the maximum output point based on a sloping pattern of the generated power in the past search, and calculates second operating values for a next search of the maximum output point so as to be supplied to the AVR control module; and the maximum power point tracking module sets a right-side operating value of the second operating values for the next search to a right side of the operation characteristic of the solar cell panel when the generated power in the past search has an upward sloping pattern, sets a left-side operating value for the next search to a left side of the operation characteristic of the solar cell panel when the generated power in the past search has a downward sloping pattern, and adds an inner operating value to be at an inner side of the operating values at 3 points when the generated power in the past search has a triangle pattern, which are calculated as the second operating values for the next search.

10. The solar photovoltaic power generator system according to claim 9, wherein the maximum power point tracking module increases a part of the second operating values at 3 points to be set for the next search when the generated power in the past search has the upward sloping pattern, decreases a part of the second operating values at 3 points to be set for the next search when the generated power in the past search has the downward sloping pattern, and adds the inner operating value so as to be at the inner side of the second operating values at 3 points to be set for the next search when the generated power in the past search has a triangle pattern.

11. The solar photovoltaic power generator system according to claim 9, wherein the maximum power point tracking module further includes a convergence determination module that determines a state where the deviation of the generated powers at 3 points is equal to or smaller than a specified value as convergence, and a renewed search commencement determination module that starts operating in accordance with information from the convergence determination module, and generates a maximum point search instruction again upon change in the generated powers at 3 points.

12. A solar photovoltaic power generator system which includes a solar cell panel, and a power conditioner which controls a voltage or a current of generated power output from the solar cell panel as a first operating value in accordance with an operation characteristic of the solar cell panel to search a maximum output point of the generated power so as to be supplied to a power system, wherein:

the power conditioner includes an inverter that converts the generated power output from the solar cell panel into a commercial power, an Automatic Voltage Regulator (AVR) control module that outputs a Pulse Width Modulation (PWM) instruction to the inverter so that the first operating value of the generated power at least at 3 points output from the solar cell panel are subjected to a variance control, a data memory module that stores a plurality of the first operating values under the variance control and a plurality of sloping patterns of the generated powers from the solar cell panel based on the first operating values, and a maximum power point tracking module that calculates second operating values for a next search of the maximum output point based on a sloping pattern of the generated power in a past search of the maximum output point so as to be supplied to the AVR control module; and when the generated power in the past search has a sloping pattern in one direction, the maximum power point tracking module adds a new operating value to a part of those in the past search to calculate the second operating values for the next search so as to be set at a side opposite the first operating values in the past search, expected to have a maximum point of the operation characteristic of the solar cell panel.

13. The solar photovoltaic power generator system according to claim 12, wherein the maximum power point tracking module adds a new operating value to a part of the first operating values in the past search in an expected direction of the maximum point of the characteristic of the solar cell panel to calculate a plurality of the second operating values for the next search.

14. The solar photovoltaic power generator system according to claim 12, wherein the maximum power point tracking module calculates the first operating values at 3 points for the search, and adds a new operating value at 1 point to the first operating values at 2 points in the past search in the expected direction of the maximum point of the characteristic of the solar cell panel to calculate the second operating values at 3 points for the next search.

15. The solar photovoltaic power generator system according to claim 12, wherein the maximum power point tracking module calculates the first operating values at 3 points for the search, and adds new operating values at 2 points to the first operating value at 1 point in the past search in an expected direction of the maximum point of the characteristic of the solar cell panel to calculate the second operating values at 3 points for the next search.

* * * * *